UNITED STATES PATENT OFFICE.

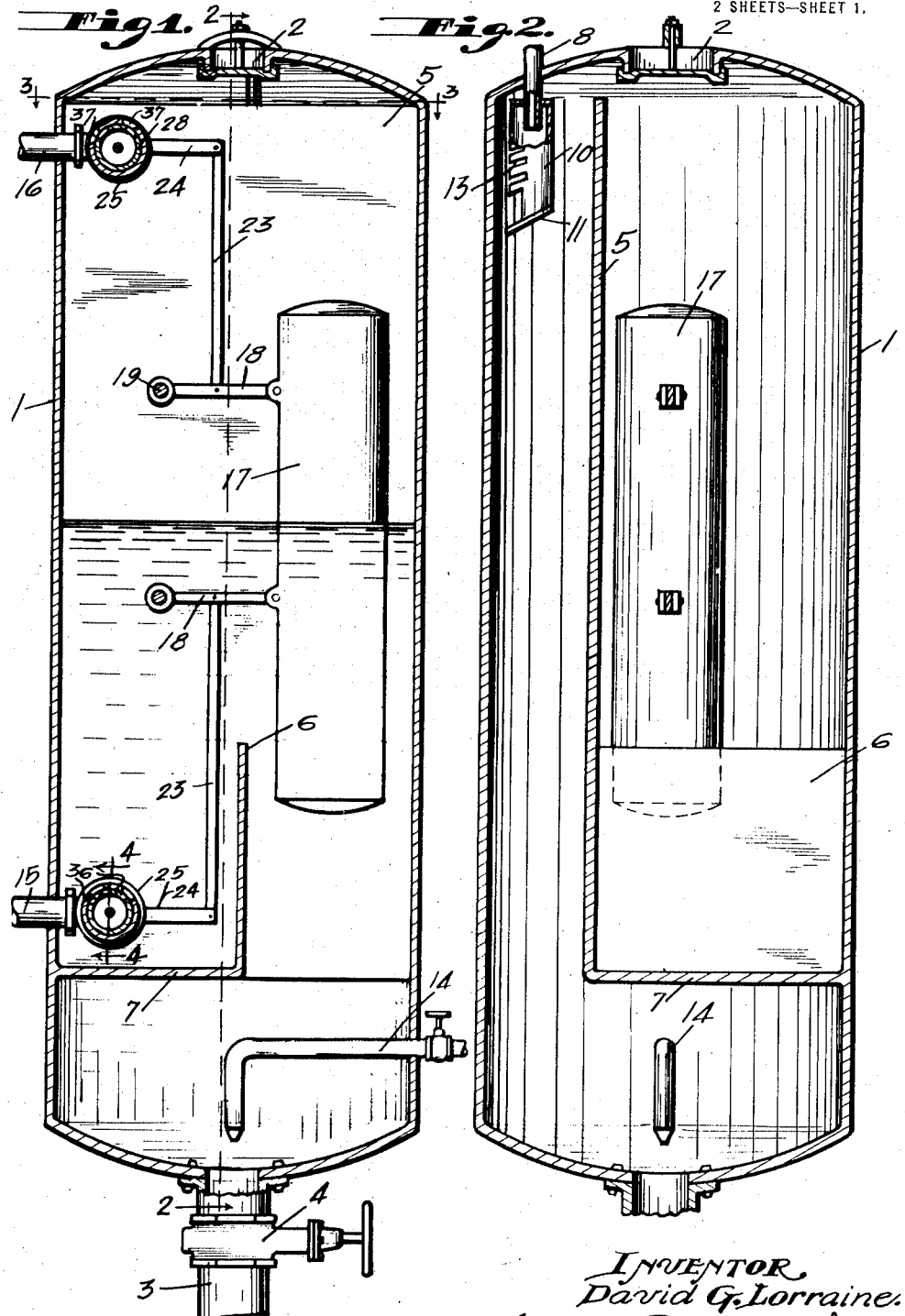

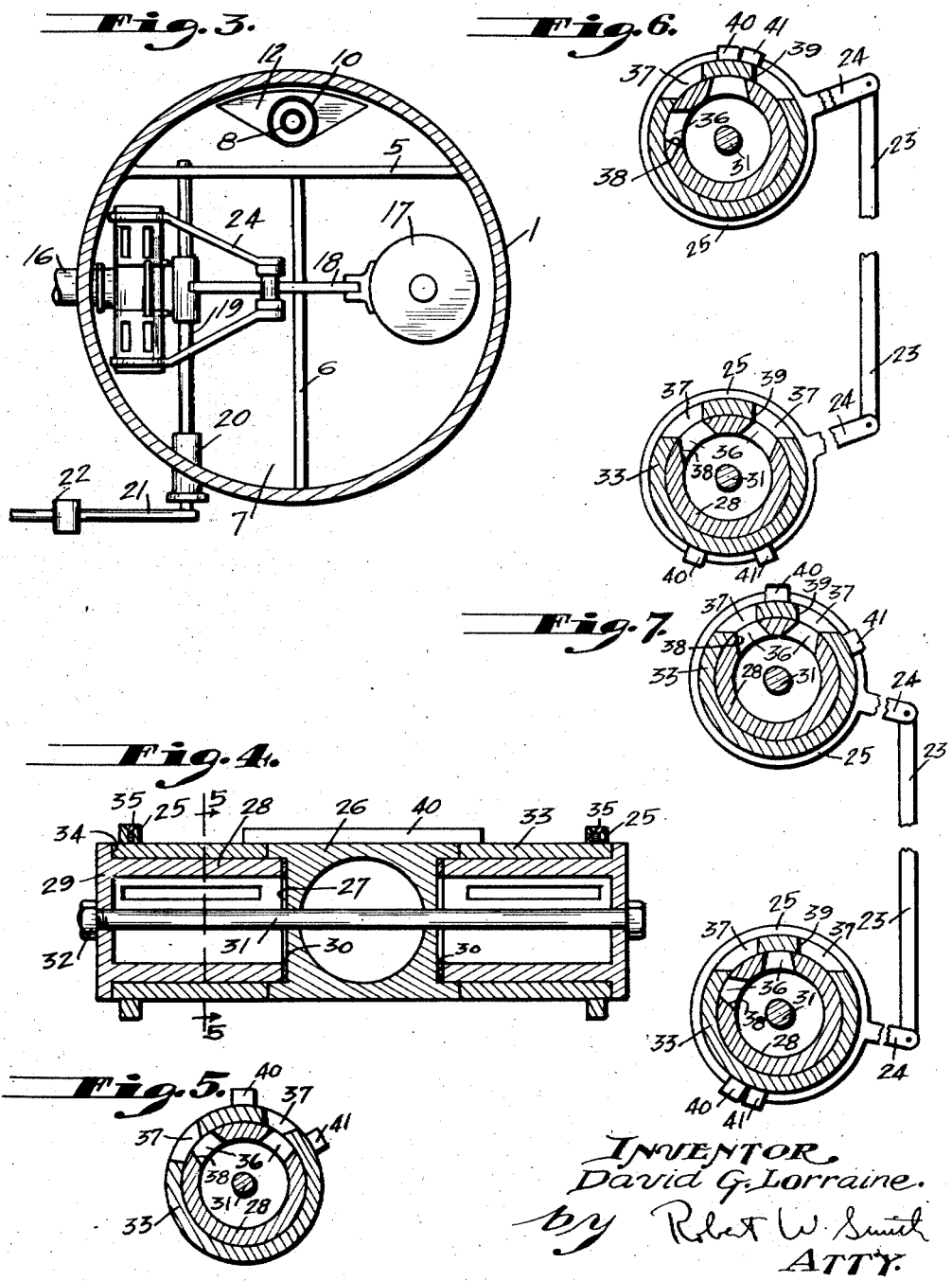

DAVID G. LORRAINE, OF LOS ANGELES, CALIFORNIA.

METHOD AND APPARATUS FOR SEPARATING OIL AND GAS.

1,396,860.   Specification of Letters Patent.   Patented Nov. 15, 1921.

Application filed February 14, 1921. Serial No. 444,696.

*To all whom it may concern:*

Be it known that I, DAVID G. LORRAINE, a citizen of the United States, residing at Los Angeles, in the county of Los Angeles and State of California, have invented new and useful Improvements in Methods of and Apparatus for Separating Oil and Gas, of which the following is a specification.

It is the object of this invention to provide an improved method and apparatus for separating the constituents of the flow from an oil well, so as to positively remove sand and water from the flow, and to collect the maximum quantity of oil and gas completely separated from one another.

The invention includes apparatus causing the flow from a well to collect in a settling chamber, so that the sand and water and other relatively heavy wastage will be deposited at the bottom of the chamber where it may be withdrawn; and causing the overflow of oil to collect in a second chamber, where the oil will settle and permit the gas to rise. The oil is released from its heaviest part which is at the bottom of the second chamber. The gas rising from the flow is released from above the settling chambers.

Valvular discharge means are provided for the oil and gas respectively, and these valves are dependently actuated by variations in the flow, so as to cause one of the same to open as the other closes. By this arrangement a balanced construction is provided which is extremely sensitive in its action, and which will function with but slight movement of the valves as the flow varies.

The improved construction will also tend to cause the well to flow steadily, and by thus preventing its flowing in heads, production is increased, and the well is prevented from "sanding up." This result is accomplished by the oil and gas releasing means, which is so arranged as to automatically decrease the gas release while the proportion of gas decreases during the flow of a head, and since the oil flow is increasing, a volume of gas will collect in the apparatus for providing a cushioning effect tending to hold back the head.

In similar manner, when there is a tendency of the flow to decrease, the gas release will increase while the oil release decreases, so that the proportion of gas to oil in the apparatus is lessened in order that there may be no obstruction to the flow.

The result is an apparatus which is automatic in its action to properly separate the oil and gas, and at the same time collect all wastage therefrom, and which has been found in practice to increase production and to also collect the maximum quantity of gas from the flow.

The invention will be readily understood from the following description of the accompanying drawings, in which:

Figure 1 is a longitudinal section through a separator constructed in accordance with the invention.

Fig. 2 is a similar view taken on the line 2—2 of Fig. 1.

Fig. 3 is a transverse section on the line 3—3 of Fig. 1.

Fig. 4 is a detail section on the line 4—4 of Fig. 1.

Fig. 5 is a transverse section on the line 5—5 of Fig. 4.

Fig. 6 is an enlarged section through the valve mechanism, partly broken away and showing the lower valves open.

Fig. 7 is a similar view showing the upper valves open.

The separator consists of a closed casing 1, preferably having a man hole 2 in the top thereof, and a sand discharge 3 at its base. The latter is provided with a valve 4.

A transverse partition 5 is arranged within the casing at one side thereof, and terminates just below the top of the casing, and at a point spaced a considerable distance from the bottom thereof. A second partition 6 extends at right angles from partition 5 across the larger part of the main casing. This partition terminates at the base of partition 5 and extends upwardly an appreciable distance within the main casing. A bottom 7 projects from one side of the main casing and is connected to partitions 5 and 6 at the angle formed thereby.

By this arrangement it will be seen that an intake chamber is formed in back of partition 5, which communicates at its lower end with a settling chamber beneath the partitions. This settling chamber extends upwardly in front of partition 5, and communicates above partition 6 with the oil collecting chamber formed by bottom 7 and the two partitions. The gas from the flow, will rise over the top of partition 5, and will also rise from the oil as it overflows into the oil chamber, so that said gas is collected in the upper part of the main casing.

The flow from a well is discharged into the upper end of the intake chamber, and for this purpose a pipe 8 extends through the top of the main casing into said intake chamber. An enlarged pipe 10 depends from pipe 8 with the latter extending into the enlarged pipe which is closed at its lower end by the plate 11 inclined toward the wall of the casing. The plate may be provided with side extensions 12 forming baffles. Pipe 10 is positioned close to the wall of casing 1 and is provided with discharge openings 13, one above another, and shown as downwardly inclined slots.

As the flow passes downwardly through the intake chamber and into the settling chamber, the heavier constituents, forming wastage, such as sand and water, will collect in the bottom of the settling chamber, and may be withdrawn through pipe 3. In order to facilitate the removal of sand, a flushing pipe 14 extends into the settling chamber and terminates in a nozzle above discharge 3.

An oil discharge pipe 15 extends from the bottom of the oil collecting chamber, and a gas pipe 16, preferably in alinement therewith, projects through casing 1 just below the top of partition 5. Valvular means are connected to these pipes inside of the main casing, and these valves are preferably sleeve valves; and are dependently actuated as the flow varies, to close one of the same as the other opens.

The means for actuating the valves includes a float 17, suspended within the main casing in front of partition 5, and projecting above and at the side of the oil collecting chamber. Arms 18 are pivoted to the float and are journaled upon rods 19 extending transversely of the main casing. One of the rods, shown as the upper one, extends through a bushing 20 to the outside of the separator, and is provided with a laterally extending arm 21 having an adjustable counterweight 22 thereon.

Links 23 extend upwardly and downwardly from the respective arms 18, and are pivoted thereto, and to valve actuating arms 24, which terminate in rings 25 received on the ends of the rotating sleeves of the respective valves for pipes 15 and 16.

The valve for each pipe includes a T joint 26 connected to the pipe, and having seats 27 at its respective ends for sleeves 28 having outer end closure plates 29. Gaskets 30 are provided between the sleeves and the T joint, and the sleeves are removably held in place and against rotation by a bolt 31 extending through the valve structure and through plates 29, with nuts 32 threaded upon the outer ends of the bolt.

Rotatable sleeves 33 are received upon the respective sleeves 28 of a valve, and are held against axial displacement by abutment against the T joint and against flanges 34 provided by closure plates 29. The rings 25 are received upon the outer ends of sleeves 33 and are fixed thereto, as by set screws 35, so that movement of float 17 responsive to variations of the liquid level within the separator, will rotate the sleeves 33 of the valves.

Circumferentially spaced ports 36 are provided in each sleeve 28, and coöperating ports 37 are arranged in sleeve 33. The sides of ports 36 are beveled outwardly as shown at 38, while the sides 39 of ports 37 are similarly beveled inwardly, so that when sleeves 33 are rotated to either open or close the valves, knife edges are provided for cutting sand and the like, and thereby preventing cutting out of the valves.

The ports of the respective valves are so arranged, that when the sleeves of the upper valve have been rotated to close the same, the lower valve will be open, as clearly shown in Fig. 6; and in similar manner, when the sleeves are reversely rotated to open the upper valve, the lower valve is closed (Fig. 7).

Lugs 40 are arranged upon T joints 26, extending the length thereof, and projecting over sleeves 33; and lugs 41 are provided upon the inner ends of sleeves 33 for abutment against lugs 40. The various lugs upon the rotating sleeves are so arranged that when the upper valve is closed, and the lower valve is in full open position, the lugs 41 of the upper valve will impinge lug 40; and when the upper valve is fully open, the lugs 41 of the lower valve will impinge against their lug 40 with said valve closed.

A construction is thus provided wherein the engagement of lugs 40—41 of one valve with the same closed, will register the opposite valve fully open; and it is to be further noted that the abutment of said lugs coöperating with the rotating force exerted upon the valve, will bind the rotating sleeves 33 to their seats with a twisting force exerted diagonally across said sleeves, so as to tightly close the valve.

When the separator is in operation, the major portion of the gas rising from the flow as it enters the intake chamber, will collect in the top of the casing, over the top of partition 5. The flow will collect in the settling chamber, so that sand and other wastage may be withdrawn. The overflow of oil will pass into the oil collecting chamber, and during this time the remainder of the gas mixed with the oil will separate and rise in casing 1. The heavier oil will settle to the bottom of the oil chamber, so that it will always be this heaviest body of oil which is withdrawn through pipe 15.

As the oil collects in the separator, the float will rise and thereby increase the oil discharge. At the same time the gas release is cut down, so that gas will collect in casing 1 and thereby tend to form a cushion for preventing the well flowing in heads. In similar manner, when the oil flow diminishes the float will drop and thereby cut off the oil discharge to a certain extent, while permitting a larger volume of gas to escape. As a result there will be no gas in the separator tending to hold back the flow.

The improved construction thus provides means for maintaining a comparatively steady flow, and in practice it has been found that the float will have but slight movement, due to the automatic regulation of the flow as just described. As a consequence, increased production is obtained, while at the same time completely separating the gas from the oil, and also removing all sand and the like.

It will be apparent that various changes may be made in the construction as thus described without departing from the spirit of the invention.

What I claim is:

1. The method of separating the constituents of the flow from a well which consists of discharging said flow into a settling chamber, collecting the rising constituents of the flow in a second settling chamber, increasingly discharging the oil from said second settling chamber and decreasingly discharging the gas rising therefrom as the flow increases, and decreasingly discharging the oil from the second settling chamber and increasingly discharging the gas rising from the same as the flow decreases.

2. The method of separating the constituents of the flow from a well which consists of discharging said flow into a settling chamber, withdrawing the settled constituents as desired, collecting in a second settling chamber, only the rising constituents which have passed through the lower portion of the first settling chamber, withdrawing the settled constituents from the second chamber, and collecting the lighter constituents rising from the settling chambers.

3. The method of separating the constituents of the flow from a well which consists of discharging said flow into a settling chamber, withdrawing the settled constituents by manually controlled means, collecting in a second settling chamber, only the rising constituents which have passed through the lower portion of the first settling chamber, automatically withdrawing the settled constituents from the second settling chamber as the flow increases, and collecting the lighter constituents rising from the settling chambers.

4. The method of separating the constituents of the flow from a well which consists of discharging said flow into a settling chamber, collecting the rising constituents of the flow in a second settling chamber, and increasingly and decreasingly opening discharge means for the oil in the second settling chamber and for the gas rising from the same, respectively, proportional to the flow from the well.

5. An apparatus of the character described comprising a settling chamber, a second settling chamber communicating therewith, and valvular discharge means for the oil and gas which is in said second settling chamber and above the same respectively, said means being dependently actuated to cause opposite opening and closing of said valvular means.

6. An apparatus of the character described comprising a settling chamber having a wall, a second settling chamber communicating therewith over said wall, and valvular discharge means for oil and gas which is in said second settling chamber and above the same respectively, said means being dependently actuated to cause opposite opening and closing of the valvular means.

7. An apparatus of the character described comprising a tank having a partition forming a settling chamber and a second chamber communicating therewith over said partition, and valvular discharge means for oil and gas which is in said settling chamber and above the same respectively, said means being actuated to cause opposite opening and closing of the valves.

8. An apparatus of the character described comprising a settling chamber having a wall, a second settling chamber communicating therewith over said wall, and valvular discharge means for oil and gas which is in said second settling chamber and above the same respectively, said means being actuated to cause opposite opening and closing of the valves proportional to the flow into the settling chambers.

9. An apparatus of the character described comprising a settling chamber having a wall, a second settling chamber communicating therewith over said wall, and valvular discharge means for oil and gas which is in said second settling chamber and above the same respectively, said means being actuated to cause opposite opening and closing of the valves proportional to the flow into the settling chambers and so as to close the gas discharge valve as the flow increases.

10. An apparatus of the character described comprising a settling chamber having a wall, a second settling chamber communicating therewith over said wall, valvular discharge means for oil and gas which is in said second settling chamber and above the same respectively, and a float actuating said valves to cause opposite opening and closing of the same proportional to the flow into the settling chambers and so as to close the gas discharge valve as the flow increases.

11. An apparatus of the character described comprising a settling chamber, an offtake therefrom, flushing means discharging into said offtake, a second settling chamber arranged to collect the rising constituents from the first settling chamber, and means for separately discharging oil and gas from the second settling chamber and from above the settling chambers, respectively.

12. An apparatus of the character described comprising a settling chamber having oil and gas discharge valves, a float in said chamber, and an operating connection between said float and said valves, said valves being arranged for respective opening and closing movement and including means functioning at full opening of one of said valves to seat the opposite valve.

13. An apparatus of the character described comprising a settling chamber having oil and gas discharge valves, said valves each comprising a sleeve having ports and a rotatable member thereon including a sleeve having coöperating ports, lugs upon said rotatable members, and stops adapted to be impinged thereby, a float in the settling chamber, and an operating connection between said float and the rotatable sleeves of the valves, the ports of said valves being arranged for respective opening and closing movement as the rotatable sleeves are turned, said valves being also arranged so that at full opening of one valve the lug of the opposite valve will impinge its stop for seating the rotatable sleeve of said second valve.

14. An apparatus of the character described, comprising a settling chamber having oil and gas discharge valves, said valves each comprising a sleeve having ports and a rotatable sleeve thereon having coöperating ports, lugs upon said rotatable sleeves and stops adapted to be engaged thereby, and means for dependently actuating said rotatable sleeves, said valves being so arranged that when the lug upon the rotatable sleeve of one valve impinges its stop said valve will be closed and the rotatable sleeve of the second valve will be turned to full open position.

15. An apparatus of the character described, comprising a settling chamber having oil and gas discharge valves, said valves each comprising a sleeve having ports and a rotatable sleeve thereon having coöperating ports, lugs upon said rotatable sleeves and stops adapted to be engaged thereby for seating the rotatable sleeves upon the first sleeves, and means for dependently actuating said rotatable sleeves proportional to the flow into the settling chamber, said valves being so arranged that when the lug upon the rotatable sleeve of one valve impinges its stop, said valve will be closed and the rotatable sleeve of the second valve will be turned to full open position.

16. An apparatus of the character described, comprising a settling chamber having oil and gas discharge valves, said valves each comprising a sleeve having ports and a rotatable sleeve thereon having coöperating ports, lugs upon said rotatable sleeves and stops adapted to be engaged thereby when the rotatable sleeves are turned to close said valves, the impingement of the lugs against said stops seating the rotatable sleeves upon the first sleeves, and means for dependently actuating said rotatable sleeves proportional to the flow into the settling chamber, said valves being so arranged that when the lug upon the rotatable sleeve of one valve impinges its stop the rotatable sleeve of the second valve will be turned to full open position.

17. The method of separating the constituents of the flow from a well which consists of collecting said flow in a settling chamber, collecting the rising constituents in a second settling chamber, and opening oil and gas discharge means respectively, as the proportions of the oil and gas in the flow increase.

18. The method of separating the constituents of the flow from a well, which consists of discharging said flow into a settling chamber, withdrawing the settled constituents collecting only the rising constituents which have passed through the lower portion of said settling chamber, and separately withdrawing the lighter and the heavier constituents of the collected flow.

19. The method of separating the constituents of the flow from a well which consists of collecting said flow in a settling chamber, collecting the rising constituents only after having passed through said settling chamber, and opening oil and gas discharge means respectively, as the proportions of oil and gas in the flow increase.

20. The method of separating the constituents of the flow from a well which consists of discharging said flow into a settling chamber, collecting the rising constituents of the flow only after having passed through said settling chamber, and increasingly and decreasingly opening discharge means for the oil and for the gas rising from the same, respectively, proportional to the flow from the well.

21. An apparatus of the character described comprising a settling chamber, a chamber communicating therewith so as to receive the rising constituents therefrom only after having passed through said settling chamber, and valvular discharge means for oil and gas communicating with said second chamber, and actuated according to the proportions of oil and gas in the flow.

22. An apparatus of the character described comprising a settling chamber having a baffle arranged to cause flow into said settling chamber at one side of said baffle and thence upwardly beyond said baffle, and valvular discharge means for oil and gas beyond said baffle, and actuated according to the respective proportions of oil and gas.

In testimony whereof I have signed my name to this specification.

DAVID G. LORRAINE.

Witnesses:
J. W. SHEELEY,
CHAS. BAGG.